Patented Mar. 11, 1947

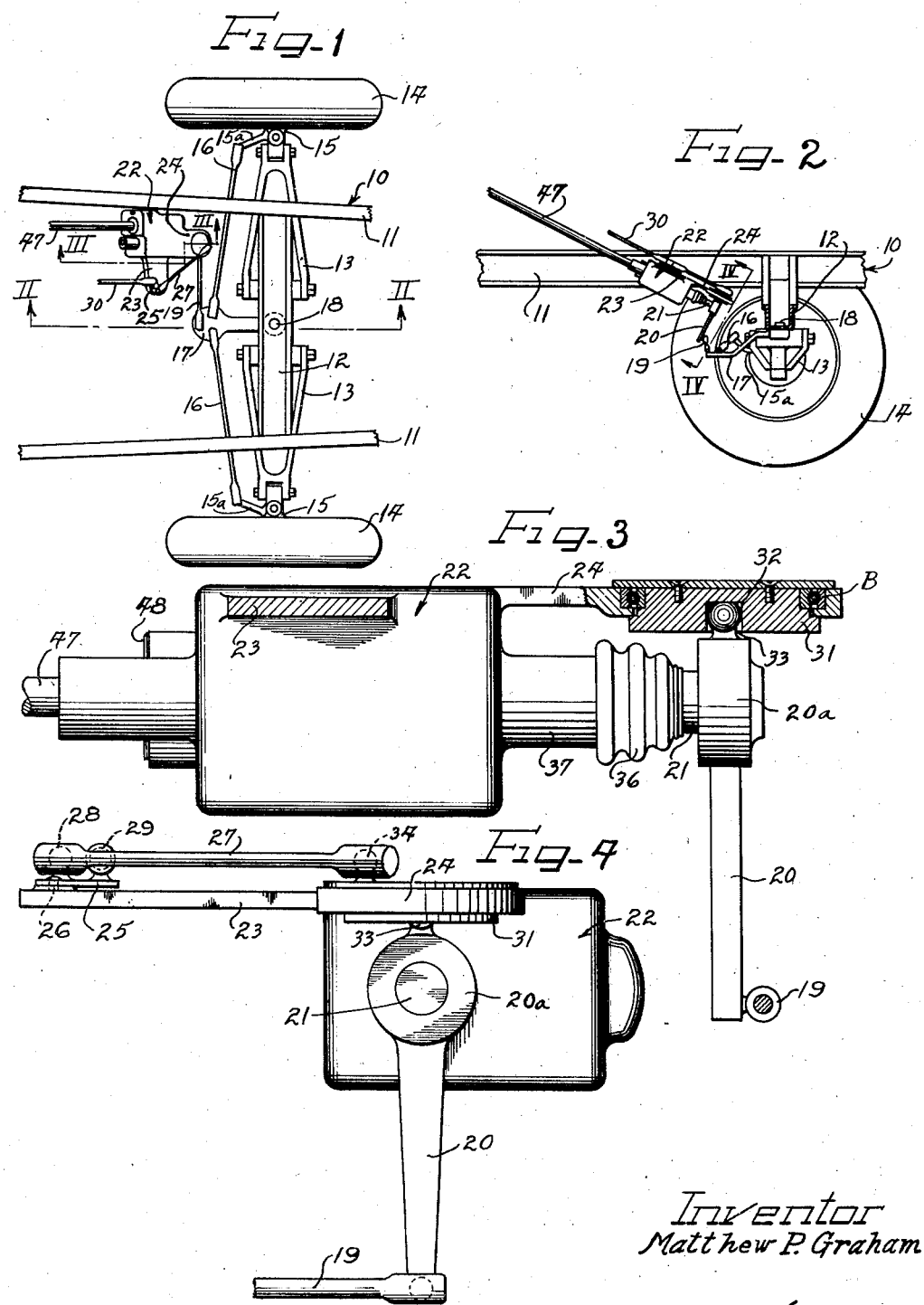

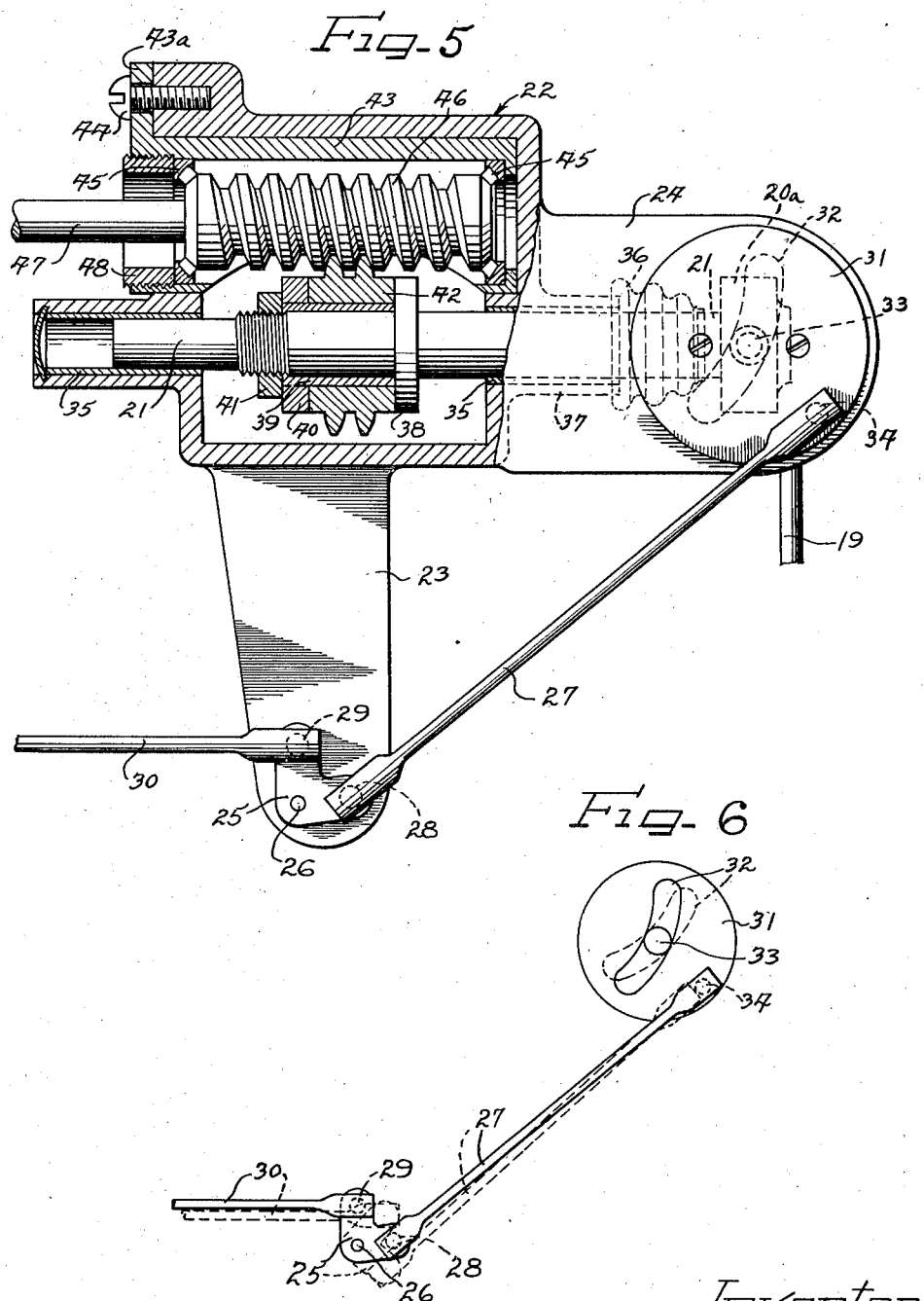

2,417,072

UNITED STATES PATENT OFFICE 2,417,072

VARIABLE RATIO STEERING GEAR

Matthew P. Graham, Detroit, Mich., assignor to Thompson Products, Inc., Cleveland, Ohio, a corporation of Ohio Application April 18, 1945, Serial No. 588,945

6 Claims. (Cl. 74—496)

This invention relates to steering mechanisms of the type disclosed and claimed in the James H. Booth application entitled: "Variable ratio steering assembly," Serial No. 589,039, filed of even date herewith.

Specifically this invention deals with an improved means for adjusting rotating movements of a slidable member to vary the reduction ratio in a steering assembly or the like.

In the above referred to Booth application, Serial No. 589,039, there is disclosed and claimed a steering assembly wherein a slidable pitman arm shaft is rotated to swing the pitman arm in amounts controlled by a link having an adjustable pivot anchor. In order that this anchor could be shifted without driving the pitman arm, it was necessary to provide an arcuate travel path for the anchor having a radius centered on the pivot for the other end of the link when the dirigible wheels were in straight-ahead position. The necessity for such an arcuate travel path for the link anchor has been eliminated by the present invention whereby a rotatable cam plate is provided for the slidable pitman arm shaft. This cam plate is easily shifted to vary the degree of swinging of the pitman arm relative to shifting movement of the pitman arm shaft.

It is, therefore, an object of the present invention to provide an improved steering assembly wherein the driving reduction can be varied at will by shifting an easily actuated cam member.

A still further object of the invention is to provide a steering assembly for dirigible parts wherein an actuating part effects sliding movement of a pitman arm shaft and wherein an adjustable cam controls swinging of the pitman arm in response to shifting of the shaft.

Another object of the invention is to provide an improved steering mechanism for automotive vehicles wherein the reduction ratio between driving and driven parts is readily varied by simple manipulation of a rotatable member.

Another object of the invention is to provide a variable driving ratio steering assembly embodying a cam plate for resolving shifting movement of a pitman arm shaft into rotating movement in amounts that can be varied at will by the operator.

Other and further objects of the invention will be apparent to those skilled in the art by the following detailed description of the annexed sheets of drawings which, by way of preferred example, illustrate one embodiment of the invention.

On the drawings:

Figure 1 is a fragmentary top plan view of an automobile chassis having independently suspended dirigible wheels actuated by a steering assembly according to this invention.

Figure 2 is a vertical cross-sectional view taken along the line II—II of Figure 1.

Figure 3 is an enlarged vertical cross-sectional view, with parts in elevation, taken along the line III—III of Figure 1.

Figure 4 is an enlarged front end elevational view taken along the line IV—IV of Figure 2.

Figure 5 is an enlarged top plan view of the device shown in Figure 4, with parts broken away and shown in horizontal cross section.

Figure 6 is a diagrammatic plan view illustrating actuation of the cam device.

As shown on the drawings:

In Figures 1 and 2 the reference numeral 10 designates generally the chassis of an automotive vehicle. The chassis 10 has side frame beams 11, 11 and a cross beam 12 near the front end thereof. Links or sub-axles 13, 13 are pivotally mounted on the cross beam 12 for supporting dirigible wheels 14, 14 in independent relation relative to the chassis. Spindle assemblies 15, 15 carry the wheels 14, 14 on the links or sub-axles 13, 13. These spindle assemblies 15 have steering arms 15a, 15a projecting rearwardly therefrom and connected to tie rods 16, 16 which, in turn, are connected to a center steering arm 17 pivoted on the cross beam 12 as at 18.

A drag link 19 connects the center steering arm 17 with a pitman arm 20 on a slidable pitman arm shaft 21 projecting from a gear box 22 which is mounted on a side frame beam 11. The gear box 22 has an integral laterally extending arm 23 and a forwardly extending arm 24.

A bell crank member 25 is pivoted to the end of the arm 23 at 26. A link 27 is connected to one arm of the bell crank by means of a ball stud 28. The other arm of the bell crank 25 has a ball stud 29 thereon connected to a control rod 30. This control rod 30 can extend through the dash (not shown) of the vehicle 10 to be conveniently accessible to the operator for shifting the bell crank 25 about its pivot 26.

The arm 24 rotatably supports a cam member 31 on anti-friction bearings B. The cam member 31 has an arcuate slot 32 therein receiving the ball end of a ball stud 33 on the boss 20a of the pitman arm 20. This boss 20a of the pitman arm is secured on the slidably mounted pitman arm shaft 21.

The cam member 31 has a ball stud 34 thereon seated in the end of the link 27.

As shown in Figure 5, the gear box 22 has bearing sleeves 35 slidably supporting the pitman arm shaft 21. The pitman arm shaft 21 projects forwardly from the bearing box 22 and a flexible boot 36 is connected at one end to the projecting portion of the shaft and at the other end to a boss 37 of the bearing box which boss supports the front bearing sleeve 35.

A collar 38 is formed integrally on, or is integrally affixed to the shaft 21 in the bearing box 22. A bearing 39 surrounds the shaft 21 and abuts the collar 38. A washer 40 surrounds the bearing 39 and a nut 41 is threaded on the shaft 21 to thrust against the washer 40. A worm follower 42 is rotatably carried on the bearing 39 between the washer 40 and the collar 38. The follower 42 can thus rotate freely around the shaft 21 but is held against relative longitudinal movement on the shaft by the collar 38 and the washer 40.

A cage 43 is carried in the gear box 22. This cage is mounted eccentrically and has a flange 43a with a slot therein receiving a lock screw 44 which is threaded into the gear box. The cage 43 carries roller bearings 45. A worm 46 is rotatably supported by the roller bearings 45. This worm is mounted on a steering shaft 47 projecting from the gear box. A collar or sleeve 48 is threaded into the cage 43 to thrust against one of the bearings 45 for holding the assembly in position.

The worm 46 meshes with the follower 42 and the eccentric cage 43 can be adjustably rotated in the gear box 22 to obtain proper meshing engagement between the worm and worm follower. This arrangement provides adjustment for wear take-up.

Rotation of the steering shaft 47 drives the worm 46 to drive the follower 42 for sliding the pitman arm shaft 21 into and out of the gear box 22. The shaft 21 carries the pitman arm 20 therewith.

Since the pitman arm boss 20a has the ball stud 33 thereon seated in the groove 32 of the cam plate 31, sliding movement of the pitman arm shaft 21 is resolved into rotating movement for swinging the pitman arm 20 to actuate the drag link 19. This drag link 19 propels the center steering arm 17 about its pivot 18 to move the tie rods 16 for actuating the steering arms 15a about their pivots thereby swinging the dirigible wheels 14, 14.

The amount of rotative movement of the shaft 21 resulting in swinging movement of the pitman arm 20 depends upon the setting for the cam plate 31 since, as shown in Figure 6, the arcuate groove 32 in this cam plate can be rotated for creating different amounts of swinging movements of the pitman arm relative to the amounts of slidable movement of the pitman arm shaft 21.

Thus, when the steering shaft 47 is actuated by the driver of the vehicle 10, the worm 46 drives the follower 42 to slide the pitman arm shaft 21. This pitman arm shaft 21, in moving toward and away from the gear box 22, will carry the pitman arm 20 therewith. However, the path of movement of the pitman arm 20 will be controlled by the cam slot 32 of the cam plate 31. Since this cam slot 32 is arcuate, the pitman arm 20 will be swung in an arc determined by the cam slot. As shown in Figure 6, since the cam plate 31 can be rotated, the cam slot 32 can assume different positions and therefore the amount of swinging of the pitman arm 20 relative to the amount of sliding movement of the pitman arm shaft 21 can be varied. This variation is controlled by the link 27, which rotates the cam plate 31, for example, to swing the slot 32 between solid and dotted line positions shown in Figure 6. The link rod 27 is actuated by the bell crank 25 which bell crank, in turn, is moved by the control link 30.

It is thus evident that the swinging movement of the pitman arm 20 to actuate the center steering arm 17 is controlled relative to the sliding movement of the pitman arm shaft 21 by the setting of the cam plate 31. In this manner, the driving reduction of the steering assembly is varied as desired without change of gears or operating parts. It is thus possible, according to this invention, to vary the reduction in the steering linkage without substitution of parts, and to provide for comfortable steering under all conditions encountered in driving an automotive vehicle. For example, a low driving reduction can be utilized for driving at ordinary driving speeds, and a high driving reduction can be utilized for parking the vehicle.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a steering assembly including a driving worm, a follower driven thereby, a slidable shaft rotatably supporting said follower, and a pitman arm on said slidable shaft, the improvement of a rotatable cam plate having an arcuate cam slot, means on said pitman arm riding in said cam slot, and manually operative means for rotating said cam plate to vary the position of said cam slot for regulating the swinging movement of the pitman arm relative to the sliding movement of said slidable pitman arm shaft.

2. In a steering assembly including a slidable pitman arm shaft, a pitman arm actuated thereby, and a steering linkage actuated by said pitman arm, the improvement of a cam member operatively connected to said slidable pitman arm shaft for resolving sliding movement thereof into swinging movement of the pitman arm, and means for adjusting said cam member to vary the amount of swinging movement relative to the amount of sliding movement.

3. A steering assembly comprising a gear box, a worm rotatably mounted in said gear box, a pitman arm shaft slidably mounted in said gear box, a follower freely rotatable on said pitman arm shaft and meshed with said worm, an arm projecting laterally from said gear box, a bell crank on said arm, a link actuated by said bell crank, a control rod for swinging said bell crank, a second arm projecting from said gear box, a cam plate rotatably mounted in said second arm, means connecting said link to said cam plate for rotating the cam plate in response to movement of said bell crank, said cam plate having a cam groove therein, a pitman arm on said slidable shaft, and means on said pitman arm seated in said cam groove for resolving sliding movement of the pitman arm shaft into swinging movement of the pitman arm in accordance with the setting of the cam plate.

4. In a selective mechanical movement assembly including a driving part, a sliding part driven thereby, and a swingable member on said sliding part, the improvement of a rotatable cam plate engaging said swingable member for resolving sliding movement of the sliding part into swinging movement for the swingable member, and means for rotating said cam plate to vary the amount of said swinging movement relative to the amount of said sliding movement.

5. A steering assembly comprising a gear box, a worm rotatably mounted in said gear box, a steering shaft for driving said worm, a pitman arm shaft slidably mounted in said gear box, a follower rotatably mounted on said pitman arm shaft in meshed engagement with said worm, a pitman arm on said pitman arm shaft, a first arm on said gear box, a rotatable cam plate carried by said first arm, an arcuate cam slot in said cam plate, means on said pitman arm riding in said cam slot, a second arm projecting from said gear box, a bell crank on said second arm, a link connecting said bell crank with said rotatable cam plate, and means for swinging said bell crank on said second arm for rotating the cam plate to vary the position of the cam slot for varying the amount of swinging movement of the pitman arm relative to the amount of sliding movement of the pitman arm shaft.

6. A variable ratio mechanical movement assembly comprising a rotatable driving part, a reciprocal driven part, and an adjustable cam coacting with said driven part to resolve the driven reciprocal movement thereof into rotating movement whereby the setting of the cam will determine the ratio of rotating movement between the driving and driven parts.

MATTHEW P. GRAHAM.

REFERENCES CITED

The following references are of record in the file of this patent:

FOREIGN PATENTS

| Number | Country | Date |
| --- | --- | --- |
| 789,745 | French | Aug. 26, 1935 |
| 480,054 | British | Feb. 16, 1938 |